United States Patent [19]

Cericola et al.

[11] Patent Number: 5,042,306

[45] Date of Patent: Aug. 27, 1991

[54] MULTIPLE DIRECTION VIBRATION FIXTURE

[75] Inventors: Fred Cericola; James W. Doggett; Terry L. Ernest, all of Albuquerque, N. Mex.; Tommy G. Priddy, Rockville, Md.

[73] Assignee: The United States of America as represented by the Department of Energy, Washington, D.C.

[21] Appl. No.: 496,712

[22] Filed: Mar. 21, 1990

[51] Int. Cl.$^5$ .............................................. B06B 3/00
[52] U.S. Cl. ...................................................... 73/667
[58] Field of Search ................ 73/662, 663, 665–668, 73/865.6, 865.3

[56] References Cited

U.S. PATENT DOCUMENTS

| | | |
|---|---|---|
| 706,102 | 8/1902 | Pendleton . |
| 972,463 | 10/1910 | Moe . |
| 1,509,099 | 9/1924 | Coleman . |
| 2,301,967 | 11/1942 | Nosker et al. .......................... 73/151 |
| 2,314,192 | 3/1943 | Behrens ................................ 209/482 |
| 2,822,127 | 2/1958 | Sinn ........................................ 233/2 |
| 3,494,327 | 2/1970 | Pearson .............................. 118/418 |
| 3,609,921 | 10/1971 | Foster et al. .......................... 51/164 |
| 4,061,019 | 12/1977 | Blasetti ................................. 73/662 |
| 4,875,374 | 10/1989 | Pinson ................................... 73/667 |

FOREIGN PATENT DOCUMENTS

| | | | |
|---|---|---|---|
| 0067832 | 4/1985 | Japan ..................................... | 73/667 |
| 0913098 | 3/1982 | U.S.S.R. .............................. | 73/663 |

OTHER PUBLICATIONS

"CAVCTS: Combined Acceleration, Vibration, and Climatic Test System", a machine developed by MBIS of U.S.A. for DRDL of the Indian Government.

P. Adams et al., "The Sandia National Laboratories 8.8-Metre (29-Foot) and 10.7-Metre (35-Foot) Centrifuge Facilities", SAND80-0481, May 1980.

Primary Examiner—Robert Raevis
Attorney, Agent, or Firm—Anne D. Daniel; James H. Chafin; William R. Moser

[57] ABSTRACT

An apparatus for simulating a rocket launch environment on a test item undergoing centrifuge testing by subjecting the item simultaneously or separately to vibration along an axis of centripetal force and along an axis perpendicular to the centripetal force axis. The apparatus includes a shaker motor supported by centrifuge arms and a right angle fixture pivotally connected to one of the shaker motor mounts. When the shaker motor vibrates along the centripetal force axis, the vibrations are imparted to a first side of the right angle fixture. The vibrations are transmitted 90 degrees around the pivot and are directed to a second side of the right angle fixture which imparts vibrations perpendicular to the centripetal force axis. The test item is in contact with a third side of the right angle fixture and receives both centripetal-force-axis vibrations and perpendicular axis vibrations simultaneously. A test item can be attached to the third side near the flexible coupling or near the air bag to obtain vibrations along the centripetal force axis or transverse to the centripetal force axis.

12 Claims, 1 Drawing Sheet

MULTIPLE DIRECTION VIBRATION FIXTURE

The United States Government has rights in this invention pursuant to Contract No. DE-AC04-76DP00789 between the United States Department of Energy and AT&T Technologies Inc.

BACKGROUND OF THE INVENTION

The present invention relates to the field of vibration testing, and more particularly to the field of combined vibration testing and centrifuge testing of electromechanical subsystems to verify capabilities in rocket launch environments.

Vibration testing is a technology that has many applications in industry. Many manufactured products are subjected to high frequency vibrations (up to 3 kHz) to determine the reliability of the products in a vibration environment. Moreover, in simulating a rocket launch environment, vibrations are imposed on the tested item in the presence of acceleration forces. More specifically, rocket powered missile launch presents a variety of acceleration force and vibration force environments which stem from missile launch, powered flight, and reentry. Many manufactured products form the on-board control systems and the payloads of rockets and rocket powered missiles, and such products are tested as to their capabilities in the rocket launch environment.

Presently, ground testing evaluation techniques are known which simulate a rocket launch environment and which employ centrifuge test devices that permit the addition of vibrational forces. One such known technique employs an electrodynamic shaker which is positioned in an in-line or cross-arm configuration on a centrifuge to provide selectable vibration directions. A problem, however, associated with this technique is the presence of an internal bearing or other forms of side load restraints which inherently impose undesirable limitations on the shaker performance. More specifically, the shaker is prevented from providing a precisely controllable, broadband vibration environment in the presence of the centripetal force created by the centrifuge. It would be desirable, therefore, to provide a precisely controllable, broadband vibration environment in the presence of centripetal force to permit a more accurate simulation testing environment for testing parts in a variety of acceleration and vibration conditions experienced in rocket launch, powered flight, and reentry.

Another known ground testing evaluation technique which simulates a rocket launch environment employs two electrodynamic shakers and a slip table to provide vibration to test items on a centrifuge. This technique is hampered by distortion of acceleration waveforms and decoupling of the vibratory motion. The two shakers are rotated on the centrifuge arm to produce the various vibration lines of action.

Generally speaking, the known testing techniques employing electrodynamic shakers on centrifuges provide undesirable distortion of vibration frequencies. It would be desirable, therefore, to provide an apparatus that employs an electrodynamic shaker that provides high fidelity and undistorted vibrations to the item under test on a centrifuge.

Moreover, the known testing techniques employing vibrations imposed on centripetal forces do not provide precisely controllable vibrations in a high frequency range (up to 3 kHz). It would be desirable, therefore, to provide a testing apparatus that provides precisely controllable high frequency vibrations to a test item in an environment experiencing centrifugal forces.

SUMMARY OF THE INVENTION

Accordingly, it is a primary object of the present invention to provide a precisely controllable, broadband vibration environment in the presence of centripetal force to permit a more accurate simulation testing environment for testing parts in a variety of acceleration and vibration conditions experienced in rocket launch, powered flight, and reentry.

Another object of the invention is to provide a precisely controllable, broadband vibration environment to permit a more accurate simulation testing environment for testing parts in a variety of vibration conditions.

Another object is to provide an apparatus that employs an electrodynamic shaker that provides high fidelity and undistorted vibrations to an item under test on a centrifuge.

Still another object of the invention is to provide a testing apparatus that provides precisely controllable high frequency vibrations to a test item in an environment experiencing centripetal forces.

Additional objects, advantages, and novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an improved apparatus is provided for imparting vibrations to an item on a device exerting an acceleration force on the item along a line. The apparatus of the invention may be used for simulating accelerations and vibrations of a rocket launch environment on a test item. The vibration imparting apparatus of the invention includes a source for providing vibrations along the line of acceleration force, a means for mounting the vibration source onto the device exerting the acceleration force, and a right angle fixture in vibrational communication with the vibration source, for simultaneously vibrating the item along the line of acceleration force and along a line transverse to the line of acceleration force. Thus, the invention provides a multiple direction vibration fixture.

For simulating a rocket launch environment on a test item, the apparatus of the invention includes means for retaining the test item on a centrifuge arm, whereby the test item is subjected to centripetal force along a centripetal force axis. Means are attached to the centrifuge arm for simultaneously or separately vibrating the test item along the centripetal force axis and along an axis transverse to the centripetal force axis by directing vibrations from along the centripetal force axis to an axis transverse to the centripetal force axis.

Still other objects of the present invention will become readily apparent to those skilled in this art from the following description, wherein there is shown and described a preferred embodiment of this invention. Simply by way of illustration, the invention will be set forth in part in the description that follows and in part will become apparent to those skilled in the art upon examination of the following or may be learned with the practice of the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION

Figure 1:
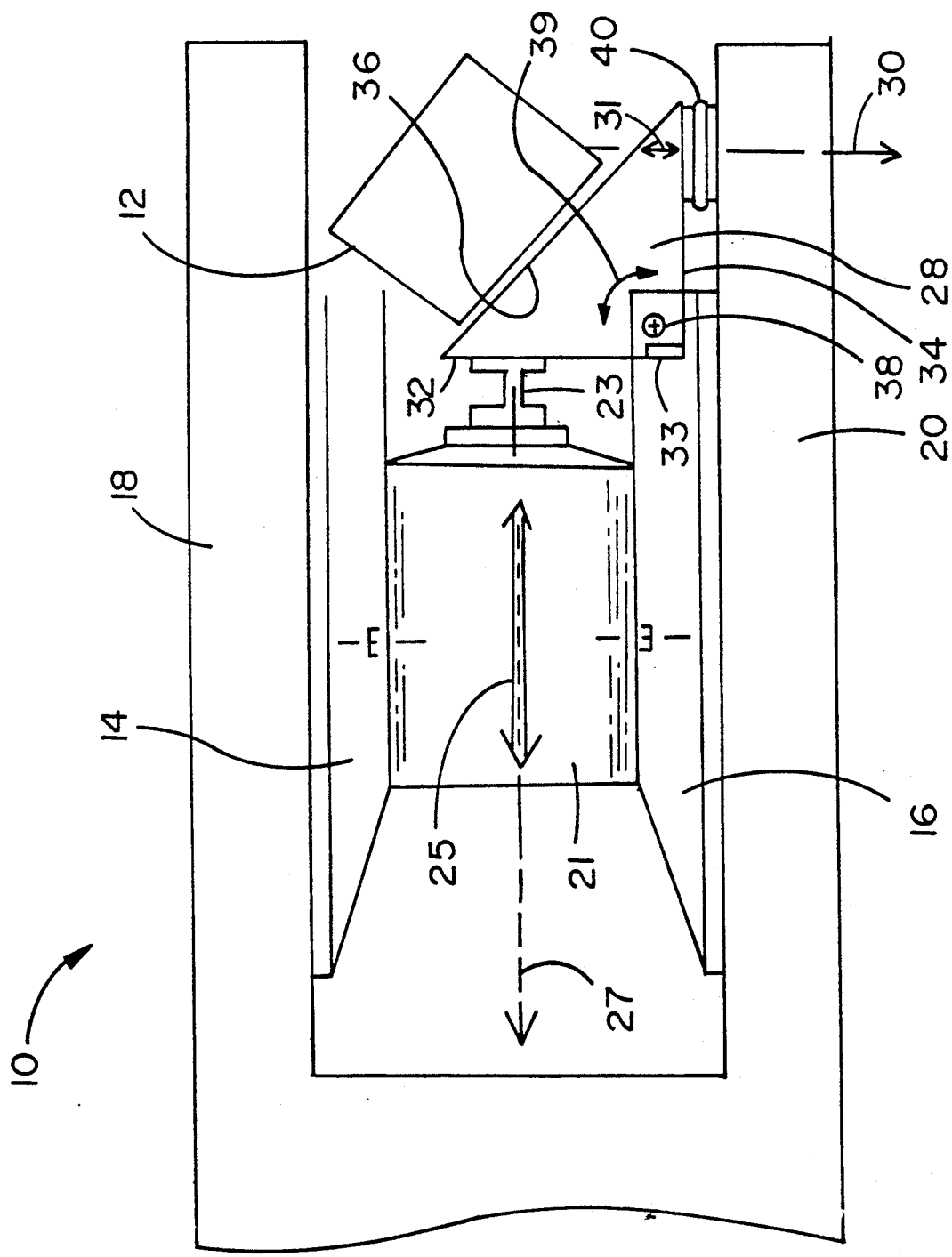
FIG. 1 is a top schematic view of an embodiment of the invention fixed to a centrifuge arm of a centrifugal test device.

With reference to FIG. 1, there is disclosed a preferred embodiment of the multiple direction vibration apparatus 10 of the present invention. The apparatus 10 may be used for simulating accelerations and vibrations of a rocket launch environment on a test item 12. The apparatus includes a shaker motor 21 mounted on centrifuge arms 18 and 20. The shaker motor vibrates a right angle fixture 28 and the test item 12 which contacts the right angle fixture 28. More specifically, the apparatus 10 shown in FIG. 1 includes mounting irons 14 and 16 that are fixed, such as by welding, to the centrifuge arms 18 and 20. The shaker motor 21 is fixed to the mounting irons 14 and 16. The shaker motor 21 vibrates flexible coupling 23 in the direction depicted by double-headed arrow 25. The orientation of arrow 25 coincides with the centripetal force axis shown by dashed arrow 27. It is well known that centripetal force is an acceleration force that pulls a centrifuged object toward the center of the circle of centrifugation. The vibrations transmitted through the flexible coupling 23 are imparted to right angle fixture 28.

The right angle fixture 28 is a key element in an assembly which serves to direct vibrations from along the centripetal force axis 27 to an axis 30 transverse, in this case perpendicular, to the centripetal force axis 27 and to the centrifuge arm 20. More specifically, the right angle fixture 28 includes a first side 32, a second side 34 adjoining the first side 32 and at a right angle 33 with respect to the first side 32, and a third side 36 extending between the ends of the first and second sides 32 and 34 and located opposite the right angle 33. A pivot 38 connects the right angle fixture 28 to the mounting iron 16. An air spring 40 is located between the second side 34 of the right angle fixture 28 and the centrifuge arm 20.

The test item 12 may be retained on the right angle fixture 28 at side 36 by bolts. Other means for securing the test item 12 to the right angle fixture 28 may also be employed.

In operation, vibrations are imparted along the centripetal force axis 27 by shaker motor 21 as the centrifuge arms 18 and 20 spin. The vibrations pass through flexible coupling 23 and are imparted onto the first side 32 of the right angle fixture 28. In response to the vibrations along the centripetal force axis 27, the right angle fixture 28 vibrates around pivot 38 as shown by curved, double-headed arrow 39. As the right angle fixture 28 vibrates around pivot 38, the vibrations (shown by a double-headed arrow 31) are directed to vibrate along axis 30 which is perpendicular to the centripetal force axis 27. The air spring 40 serves to align the right angle fixture 28 and equalize the centripetal force along the centripetal force axis 27.

As shown in FIG. 1, the test item 12 is in contact with the third side 36 of the right angle fixture 28. By being in contact with side 36 of the right angle fixture 28, the test item 12 is subjected to both types of vibration simultaneously: along the centripetal force axis 27; and along the perpendicular axis 30. A test item can also be attached to side 32 near the flexible coupling 23 or alternatively above the air bag 40 on side 34 to obtain vibrations, either along the centripetal force axis 27 or transverse to the centripetal force axis 27, respectively, thus subjecting item 12 to separate vibrations depending on its position.

As described above, the apparatus of the invention is simple in design and versatile in application. The vibration source, such as the shaker motor, is rigidly mounted on the centrifuge arms so that the source vibrates along the centripetal force axis. As a result, the need for internal side load support bearings in the shaker motor is eliminated.

The entire shaker assembly is air cooled thereby eliminating plumbing requirements for water or oil cooling media.

Furthermore, the entire shaker assembly may be a single unit assembly that can be attached to and detached from the centrifuge as a unit. In this respect, the shaker assembly can be used as a unit outside the confines of a testing system employing a centrifuge.

With the invention, centripetal force axis vibration and perpendicular axis vibration are achieved separately or simultaneously with the right angle fixture. However, rotational acceleration produced by the right angle fixture will be relatively insignificant for small test items that are mounted away from the pivot. Rotational acceleration can be enlarged and shaker output can be intensified (either force or displacement) by varying the ratio of the length of the drive lever arm (side 32 of the right angle fixture) to the length of the output lever arm (side 34 of the right angle fixture).

The right angle fixture itself is made from stiff, lightweight material and may have added damping material to limit fixture resonance problems in high frequency test bandwidths.

With the invention, apparatus is provided which is capable of producing a precisely controllable, broadband vibration environment in the presence of centripetal force to permit a more accurate simulation testing environment for testing parts in a variety of acceleration and vibration conditions experienced in rocket launch, powered flight, and reentry.

More generally, the apparatus of the invention is capable of producing a precisely controllable, broadband vibration environment to permit a more accurate simulation testing environment for testing parts in a variety of vibration conditions.

By employing the apparatus of the invention, high fidelity acceleration waveforms are produced by a commercially available electrodynamic shaker and are transferred to a test item and in a specific line of action relative to a centripetal force. The waveforms can be of high frequency (up to 3 kHz). The specified line of action can vary from test to test, but it remains fixed during any particular test. The acceleration waveforms may be sinusoidal or broadband random in character.

The foregoing description of the invention has been presented for purposes of illustration and description. It is not intended to be exhaustive or to limit the invention to the precise form disclosed. Obvious modifications or variations are possible in light of the above teachings.

The embodiment was chosen and described in order to best illustrate the principles of the invention and its practical application to thereby enable one of ordinary skill in the art to best utilize the invention in various embodiments and with various modification as are suited to the particular use contemplated. It is intended that the scope of the invention be defined by the claims appended hereto.

What is claimed is:

1. An apparatus for imparting vibrations to an item, comprising:
   (a) a device exerting acceleration force on an item along a line;
   (b) source means for providing vibrations along the line of acceleration force,
   (c) means for mounting said vibration source means on said device exerting acceleration force,
   (d) means, connected to said vibration source means, for simultaneously or separately vibrating the item along the line of acceleration force and along a line perpendicular to the line of acceleration force, comprising a right angle fixture to which the item is coupled and which transmits vibrations from said vibration source means to the item either simultaneously or separately according to the placement of the item on the right angle fixture.

2. The apparatus described in claim 1, wherein said vibration source means, mounting means, and simultaneous or separate vibration means are formed in a unified structure that can be attached to and detached from said device exerting an acceleration force.

3. The apparatus described in claim 1, wherein said right angle fixture includes a right angle portion, a first acute angle portion, and a second acute angle portion, and a first side adjacent said first acute angle portion, a second side adjacent said second acute angle portion and adjoining said first side, and a third side opposite said right angle portion and extending between and adjoining the ends of said first and second sides.

4. The apparatus described in claim 3, wherein said simultaneous or separate vibration means includes means for pivotally connecting said right angle fixture to said mounting means adjacent said right angle portion, whereby said right angle fixture is positioned in direct vibrational communication with said vibration source means adjacent said first acute angle portion, and in vibrational communication through said pivotally connecting means with said vibration source means adjacent said second acute angle portion, whereby vibration from said vibration source means are coupled to said right angle fixture along the line of accleration force adjacent said first acute angle portion and along a line transverse to the line of acceleration force adjacent to said second acute angle portion as said right angle fixture pivots around said pivotally connecting means.

5. The apparatus described in claim 3, wherein said simultaneous or separate vibration means effects vibration of the item along the line of acceleration force and along a line transverse to the line of acceleration force, simultaneously, when the item is coupled to said third side of said right angle fixture.

6. The apparatus described in claim 3, wherein said simultaneous or separate vibration means effects vibration of the item only along the line of acceleration force when the item is coupled to said first side of said right angle fixture.

7. The apparatus described in claim 3, wherein said simultaneous or separate vibration means effects vibration of the item only along a line transverse to the line of acceleration force when the item is coupled to said second side of said right angle fixture.

8. The apparatus described in claim 3, wherein the ratio of the length of said first side of said right angle fixture to the length of said second side of said right angle fixture is varied to increase rotational acceleration of said right angle fixture and to intensify output of said vibration source means.

9. An apparatus for imparting vibrations to an item, comprising:
   (a) a device exerting acceleration force on the item along a line;
   (b) source means for providing vibrations along the line of acceleration force,
   (c) means for mounting said vibration source means on said device exerting acceleration force,
   (d) means, connected to said vibration source means, for simultaneously or separately vibrating the item along the line of acceleration force and along a line perpendicular to the line of acceleration force, said simultaneous or separate vibration means being comprised of a right angle fixture to which the item is coupled and which includes a right angle portion, a first acute angle portion, and a second acute angle portion, and
   (e) means for pivotally connecting said right angle fixture to said mounting means adjacent said right angle portion, whereby said right angle fixture is positioned in direct vibrational communication with said vibration source means adjacent said first acute angle portion and in vibrational communication through said pivotally connecting means with said vibration source means adjacent said second acute angle portion,
   whereby vibrations from said vibration source means are coupled to said right angle fixture along the line of acceleration force adjacent said first acute angle portion and along a line perpendicular to the line of acceleration force adjacent said second acute angle portion as said right angle fixture pivots around said pivotally connecting means, and are thus transmitted from said right angle fixture to the item coupled to said right angle fixture either simultaneously or separately according to the placement of the item on the right angle fixture.

10. The apparatus described in claim 9 wherein said right angle fixture is in vibrational communication with said vibration source means through a flexible coupling.

11. The apparatus described in claim 9 wherein said right angle fixture is in vibrational communication with said device exerting acceleration force through a flexible coupling.

12. An apparatus for imparting vibrations to an item, comprising:
   source means for providing vibrations along a first line of vibration,
   means, connected to said vibration source means, for simultaneously or separately vibrating the item along said first line of vibration and along a second line of vibration transverse to the first line of vibration, comprising a right angle fixture to which the item is coupled and which transmits vibrations from said vibration source means to the item either simultaneously or separately according to the placement of the item on the right angle fixture,
   said right angle fixture comprising a right angle portion, a first acute angle portion, a second acute angle portion, a first side adjacent said first acute angle portion, a second side adjacent said second acute angle portion and adjoining said first side, and a third side opposite said right angle portion and extending between and adjoining the ends of said first and second sides.

* * * * *